United States Patent [19]

Schegan et al.

[11] Patent Number: 5,679,392

[45] Date of Patent: Oct. 21, 1997

[54] HEAT TREATMENT OF RAW MOLLUSCAN SHELLFISH

[76] Inventors: John Schegan, 12110 E. Slauson, Suite 15, Santa Fe Springs, Calif. 90670; Patrick Fahey, 1200 Harmony St., New Orleans, La. 90015; John Tesvich, Rte. 1 Box 459-E, Buras, La. 70041

[21] Appl. No.: 477,546

[22] Filed: Jun. 7, 1995

[51] Int. Cl.$^6$ .............................. B65B 25/22; A22C 29/04
[52] U.S. Cl. .............................................. 426/412; 426/129
[58] Field of Search ................................. 426/129, 412, 426/643

[56] References Cited

U.S. PATENT DOCUMENTS

| | | | |
|---|---|---|---|
| 3,615,726 | 10/1971 | McMillan | 426/241 |
| 3,658,559 | 4/1972 | Mohwinkel | 426/412 |
| 4,164,590 | 8/1979 | Mencacci | 426/412 |
| 5,268,189 | 12/1993 | Doerter | 426/412 |
| 5,281,426 | 1/1994 | Pardo | 426/412 |

FOREIGN PATENT DOCUMENTS

| | | | |
|---|---|---|---|
| 1100353 | 5/1981 | Canada | 426/412 |
| 242183 | 10/1987 | European Pat. Off. | 426/412 |
| 59/132852 | 7/1984 | Japan . | |
| 2/177851 | 7/1990 | Japan . | |

OTHER PUBLICATIONS

Food Industries of S. Africa, Nov. 1979 p. 31 (Full Text).
J. of Food Science vol. 56, No. 5 1991 pp. 1292–1294 (Full Text).
J. of Food Science vol. 49, No. 2 1984 pp. 331–333 (Full Text).
J. of Food Science vol. 53 No. 2 1988 pp. 325–327, 348 (Full Text).
Food Engineering Nov. 1979 p. 176 (Full Text).
Developments in Industrial Microbiology 1983, vol. 24, pp. 457–465.
J. of Food Protection, vol. 55, Dec. 1992 pp. 985–989.
South East Asian Fisheries Development Center 1985 p. 26 (Dialog Abstract).
J. of Food Protection, 1986, 49(11) pp. 877–879 (Dialog Abstract).
Commerce News, Nat'l Oceanic & Atm. Admin. 1979, Sen 85 4pp (Dialog Abstract).
J. of Food Science 55(2) pp. 372,373,429; 1990 (Dialog Abstract).
Alimentos, Jan.–Feb. 1994 V. 19(1) pp. 5–17 (Dialog Abstract).
Paper, Film & Foil Converter 1990, 64(6) pp. 142–144 (Dialog Abstract).
Report of Toyo Junior College of Food Technology & Toyo Institute of Food Technology 1974, No. 11, 73–79 (Dialog Abstract).

*Primary Examiner*—Steven Weinstein
*Attorney, Agent, or Firm*—Tom Hamill, Jr.

[57] ABSTRACT

A method of preparing raw molluscan shellfish meat in the shell or out of the shell is disclosed which employs a mild heat treatment and cold storage for the destruction of harmful pathogenic bacteria such as Vibrio Vulnificus. The raw molluscan shellfish, such as Oysters, arrives at the processing plant in a refrigerated state. The product is then culled, cleaned and graded into categories according the product size. The product is then enveloped in a polymer or metalized film bag to isolate the product. The bagged product is then placed on a rack which is then lowered into a circulating bath of water at a sufficient temperature and duration to kill the pathogens yet leave the meat in a raw state. The rack is then removed from the heated water bath and placed in a cold water bath with a continuous flow for a time period. The rack is removed from the cold water bath. At no time did the hot or cold bath waters come in contact with the bagged mollusk (product). The bags are then packaged for storage and transport. The packed product is placed in refrigerated storage until shipped to the customer in a refrigerated transport. The mollusk remain in a raw state and in the shell throughout the process. The pathogenic bacteria are reduced to an undetectable level by this process.

3 Claims, 1 Drawing Sheet

HEAT TREATMENT OF RAW MOLLUSCAN SHELLFISH

BACKGROUND OF THE INVENTION

1. Field of the Invention

The present invention relates generally to heat treatment of raw molluscan shellfish, and more particularly, to a heat treatment and cold storage process to be employed with such mollusk, such as oysters, (Genus: Ostrea) especially adapted to effect reduction of harmful bacteria found therein including Vibrio Vulnificus.

2. Description of the Prior Art

While seafoods are generally considered healthy and safe to consume, concerns about the safety of eating raw molluscan shellfish such as Oysters are widespread. Bacteria, such as the autochthonous estuarine bacterium Vibrio Vulnificus, may be transferred from the marine environment to the molluscan shellfish. This bacterium has been shown to cause primary septicemia and gastroenteritis in humans. Septicemia generally leads to secondary cutaneous lesions and necrotic ulcers of the extremities, approximately sixty percent of all known cases result in fatalities. Other bacterium may also be pathogenic and may be introduced to the human through consumption of raw molluscan shellfish meat. The Vibrio Vulnificus are located in oysters, and primarily this method will be utilized to destroy this pathogenic organism to permit the harvesting of oysters during the warmer months and in warmer waters, especially in the southern United States, where it has been proposed by the Food and Drug Administration to suspend the harvesting of oysters during the summer months as a health precaution.

The consumption of raw molluscan shellfish meat is widespread and it is desirable to permit its continued consumption without endangering the health of the consumer. No current methods employed permit the mollusk to be sterilized and remain in the raw, uncooked state. No effective means of treating oysters meant for raw consumption currently exists. Some methods for the preservation and sterilization of crustacean shellfish are known in the art, but these are directed to the canning of the product as well as to increasing the products shelf life in a commercial market. U.S. Pat. No. 5,268,189 issued to Darter discloses a process which employs a thermally conductive mixture which forms a liquid barrier upon heating and a gel upon cooling is utilized in the packaging of crustacean shellfish (crabs, lobsters, crawfish, shrimp) in container for packaging, and further placement on a shelf at a distribution point. The method employs specific heating and cooling steps which are of high temperature and long duration which destroys harmful bacteria during the packaging (canning) of the crustacean meat. The invention seems to be concerned primarily with shrimp, crabs, and lobster and spoilage bacteria associated with the canning of those items.

Thus, while the foregoing prior art indicates it to be well known to use heating and cooling to destroy unwelcome microorganisms during packaging, to increase shelf life, the temperatures employed are sufficiently high and of sufficient duration to actually cook the meat. The provision of a simple and cost effective method to safely destroy the harmful pathogenic bacteria through the use of mild heat treatment and cool storage which leaves the mollusk (oyster, clam, other mollusks) meat in a raw state is not contemplated. Nor does the prior art described above teach or suggest a method which treats the raw molluscan shellfish in the shell, that is the final product brought to the consumer will still be in its shell. This is desirable as a favorite consumer food is a mollusk on the halfshell. This process will permit the consumer to still consume his mollusk on the halfshell, in a raw state, with the harmful bacteria destroyed through the novel process of the instant invention. Other advantages of the present invention over the prior art also will be rendered evident.

SUMMARY OF THE INVENTION

To achieve the foregoing and other advantages, the present invention, briefly described, provides a method of preparing raw molluscan shellfish meat in the shell or out of the shell which employs a mild heat treatment and cold storage for the destruction of harmful pathogenic bacteria such as Vibrio Vulnificus. The raw molluscan shellfish, including, but not limited to oysters, arrives at the processing plant in a refrigerated state. The product is then culled, cleaned and graded into categories according the product size. If the product is to be shucked, the meats will be washed after this point. The product is then enveloped in a polymer or metalized film bag to isolate the product. The bagged product is then placed on a rack which is then lowered into a circulating bath of water at a sufficient temperature and duration to kill the pathogens yet leave the meat in a raw state. The rack is then removed from the heated water bath and placed in a cold water bath with a continuous flow for a time period. The rack is removed from the cold water bath. At no time did the hot or cold bath waters come in contact with the bagged mollusk (product). The bags are then packed for storage and transport. The packed product is placed in refrigerated storage until shipped to the customer in a refrigerated transport. The mollusk remain in a raw state in both the in shell and out of shell cases throughout the process. The pathogenic bacteria are reduced to an undetectable level by this process. This process retains the natural flavor of the molluscan meat, as well as the raw state and texture associated with "raw bar" style mollusk prepared for consumption.

This process is somewhat similar to pasteurization, where heat is employed to destroy harmful bacteria in milk, beer, cider etc. by heating the liquid to a prescribed temperature for a prescribed period of time. Needless to say, mollusks are not liquid, although a term such as "cool-pasteurization" may be descriptive of the instant method.

The terms mollusk and raw molluscan shellfish are utilized to primarily cover the class of marine organisms located within a shell. This includes bivalves, oysters, clams, as well as other such organisms.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining at least the preferred embodiments of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a process for the preparation of raw molluscan shellfish which reduces harmful pathogenic bacteria, such as Vibrio Vulnificus, to undetectable levels.

It is therefore an object of the present invention to provide a process for the preparation of raw molluscan shellfish which provides a mild heat treatment and the cold storage of the mollusk.

It is therefore an object of the present invention to provide a process for the preparation of raw molluscan shellfish which takes place with the mollusk remaining in the shell throughout the process, permitting harmful bacteria to be destroyed while bringing the product to the consumer in shell.

It is therefore an object of the present invention to provide a process for the preparation of raw molluscan shellfish which brings the mollusk to the consumer in a raw, uncooked state, which permits the mollusk to be prepared on the halfshell.

It is therefore an object of the present invention to provide a process for the preparation of raw molluscan shellfish in or out of the shell which isolates the product from the heat treating fluid, thereby preventing cross contamination and product degradation.

It is therefore an object of the present invention to provide a process for the preparation of raw molluscan shellfish which may be easily and efficiently performed.

An even further object of the present invention is to provide a new and improved process for the preparation of raw molluscan shellfish which is susceptible to a low processing cost with regard to both materials and labor, and which accordingly is then susceptible to placing the processed product at a low price of sale to the consuming public, thereby making such a mollusk product available to the buying public.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein.

DESCRIPTION OF THE PREFERRED EMBODIMENT

Figure 1:
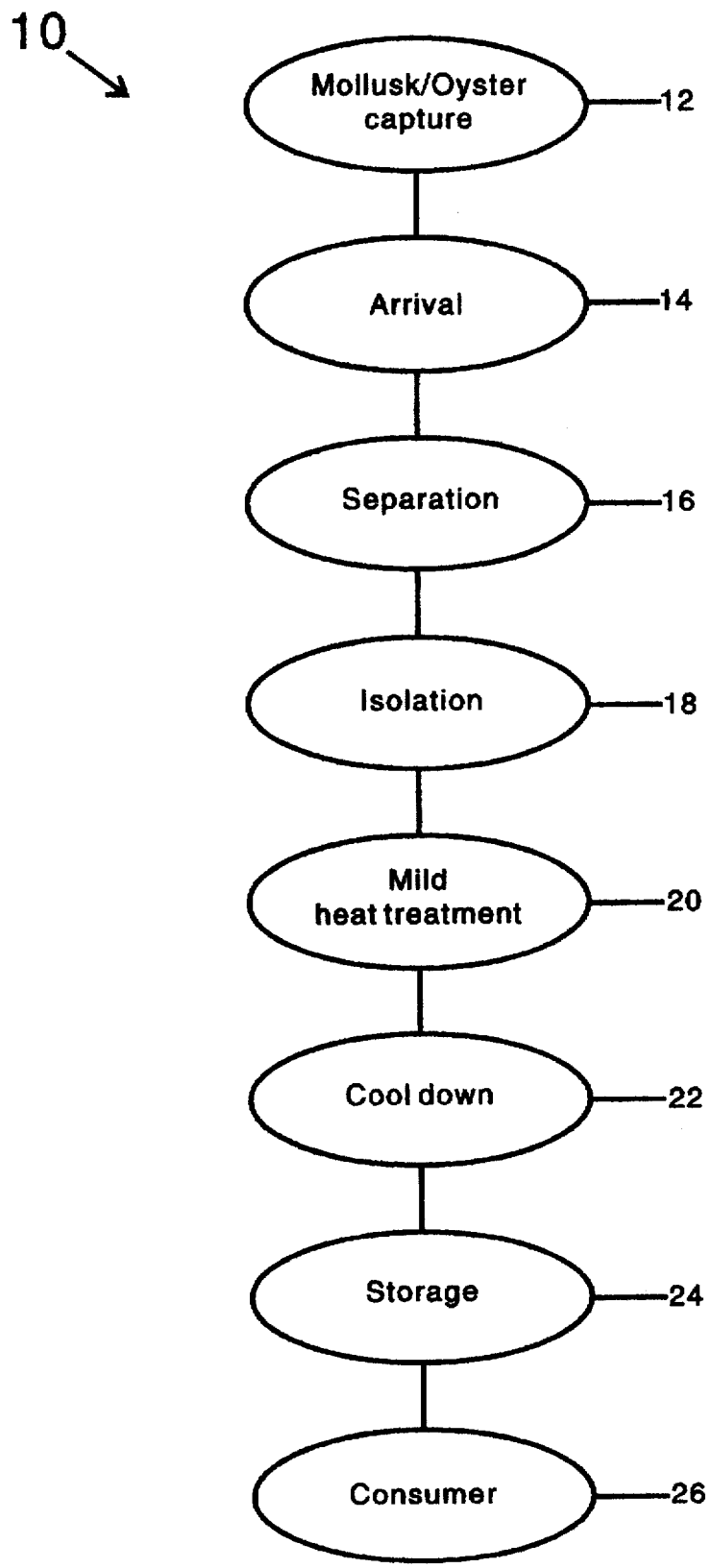
FIG. 1 is a block diagram in flowchart form showing the various steps of the process for the preparation of raw molluscan shellfish which would eliminate the pathogenic bacteria.

With reference now to the drawings, a new and improved process for the preparation of raw molluscan shellfish embodying the principles and concepts of the present invention will be described.

Turning initially to FIG. 1, there is shown a first exemplary embodiment of the process for the preparation of raw molluscan shellfish of the invention generally designated by reference numeral 10. In its preferred form, the raw molluscan preparation process 10 comprises generally several steps. The first step will be the capture step 12. The molluscan shellfish will be captured in their indigenous environment by traditional mollusk harvesting techniques. These mollusk live with the autochthonous estuarine bacterium Vibrio Vulnificus, as well as other pathogenic bacterium. It is not possible to determine from the outward appearance of the mollusk whether or not it is contaminated with any of the harmful bacterium, hence it may be appropriate to treat all harvested mollusks.

The mollusk are then transported by conventional means to the processing plant. The first step will be the arrival step 14. During this step the mollusk arrives at the processing plant. The mollusk are immediately placed in a refrigerated state, optimally between the temperatures of 32 to 34 degrees fahrenheit. This maintains the mollusk in a living state, above freezing, with minimal degradation.

The second step will be the separation step 16. During the separation step, the mollusk is culled, removing large external debris. The mollusk is also cleaned during the separation step, removing mud, dirt and other fine debris from the mollusk. This may be accomplished by a variety of means including water spray. The debris, dirt and mud will be disposed of, with the used water by any suitable conventional method. During the separation step 14 the product is also separated into two grades according to size, and then placed in groups of 12 of the same grade and transported to the next area, which is the isolation area. It is to be understood that the group of 12 mollusks are chosen here for convenience, as a dozen oysters is a common grouping. Other groupings may be employed with this method. The transportation may include a conveyor, which will bring the groups of 12 mollusks to the isolation area.

At this point in the method the oysters (or other mollusk) may be shucked, removing the meat from the shell. The subsequent steps of the process are identical for the mollusk meat or the mollusk still in the shell. The group of 12 mollusks may refer to the group of shucked mollusk meat below.

The third step is the isolation step 18. In order to isolate the mollusk from the upcoming heat treatment, the mollusk is enveloped in a plastic polymer film or metalized film during the isolation step 18. The group of 12 mollusks are placed in a plastic film, which is then sealed in an automated vacuum bagging machine. If the mollusks are shucked, they may be placed in the bag by unit weight or volume per unit bag. Automated vacuum bagging machines are known and conventional, however, modifications may be made to better handle the group of 12 mollusks, depending on their grade and the frequency of bagging. The air is removed from the plastic film enveloping the oysters leaving the group of 12 mollusks vacuum sealed within the plastic polymer film or metalized film. Air may or may not remain in the bag, certainly there will be some air left. This vacuum sealed structure as well as the material properties of the polymer/metalized film about the group of 12 mollusk will permit good thermal conductivity during the upcoming mild heat treatment 20 and cool down steps 22. The plastic/metalized film is chosen to be of sufficient thickness to prevent inadvertent puncturing by sharp edges of the mollusk, but of sufficient thinness to permit good heat transfer. Several commercially available products will meet the aforementioned criterion. The now completely covered and sealed (bagged) group of 12 mollusk are transported to the mild heat treatment step 20. This transport may be a conveyer or other equivalent means.

The fourth step in the process is the mild heat treatment step 20. The bagged group of 12 mollusk are placed on a rack or other suitable device. These racks are placed in the heat treatment container. Within the container is a circulating bath of purified water with other trace components. The temperature of the water bath is between 120-130 degrees fahrenheit and the mild heat treatment process step lasts between 30 to 45 minutes depending on the grade size being treated. A marginally cooler or hotter water bath may be employed with an appropriately adjusted time period. The increased/decreased possible range of the water bath is (+/-) 10 degrees fahrenheit. The temperature of the water bath and immersion time period is selected as to not cook the mollusk, therefore the mollusk remains in a raw state. The water bath never touches the product, as the product is surrounded by a sealed plastic film. This plastic or metalized film is chosen to be such that it has heat resistant properties, able to easily withstand the temperature of the water bath. By employing such a sealed plastic film, the mollusk (product) are treated in their own natural liquor with no contamination by the water bath.

The fifth step in the process is the cool down step 22. The racks are removed from the hot water bath and the product is then placed in a cold water bath. The cold water bath is between the temperatures of 28-32 degrees fahrenheit and is of a continuous flow variety, that is, the water continuously flows about the product due to the action of an impeller or pump. The product is cooled in the cool water for 15 to 20 minutes depending on which grade (size and weight) of product is being treated.

The sixth step in the process is the storage step 24. During this step the plastic bags may be punctured or may remain intact, are subsequently packed in groups of 12 (or other appropriate numbers, depending on packaging etc.) and placed in refrigeration. The refrigeration is between 32-34 degrees fahrenheit until shipped to the consumer in refrigerated transport.

The seventh and final step of the process is the consumer step 26. During this step, the consumer enjoys a raw molluscan shellfish which retains its natural flavor and raw texture without the fear of ingesting a harmful pathogenic bacteria.

It is apparent from the above that the present invention accomplishes all of the objectives set forth by providing a new and improved process for the preparation of raw molluscan shellfish which reduces harmful pathogenic bacteria, such as Vibrio Vulnificus, to undetectable levels, which provides a mild heat treatment and the cold storage of the mollusk and which takes place with the mollusk remaining in its natural state throughout the process, permitting harmful bacteria to be destroyed while bringing the product to the consumer in shell, in a raw, uncooked state, which permits the mollusk to be prepared on the halfshell, or by other known preparation methods.

By employing the aforementioned process, one destroys the harmful bacteria, yet leaves the mollusk in a raw state, still in the shell, which is viable for commercial consumption.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A process for the treatment of raw molluscan shellfish where the shellfish remain in their natural shell throughout the process, including the steps of:
   a) placing the live, unshucked, raw molluscan shellfish in a sealable bag,
   b) sealing the sealable bag to isolate the live, unshucked, raw molluscan shellfish,
   c) heat treating the unshucked, raw molluscan shellfish by placing the sealed bag in a fluid bath at a temperature of about 110 to 140 degrees Fahrenheit (43.33 to 60 degrees Centigrade) for 30 to 45 minutes, said heat treating being at a temperature and for a time sufficient to destroy harmful pathogenic bacteria including vibrio vulnificus, yet leave the shellfish in a raw state,
   d) cooling the heat treated, unshucked, raw molluscan shellfish by placing the sealable bag in a fluid bath at a temperature of about 28-32 degrees Fahrenheit for 15 to 20 minutes,
   e) shucking the cooled, raw molluscan shellfish, and
   f) serving the shucked, cooled, raw molluscan shellfish, raw on the half shell.

2. A process for the treatment of raw molluscan shellfish as claimed in claim 1 wherein the sealable bag is a polymer bag.

3. A process for the treatment of raw molluscan shellfish as claimed in claim 1 wherein the sealable bag is a metalized film bag.

* * * * *